United States Patent
Enggasser et al.

(12)

(10) Patent No.: US 6,274,659 B1
(45) Date of Patent: Aug. 14, 2001

(54) METHOD OF MANUFACTURING POLYESTER GRANULES WITH IMPROVED PHOTOCHEMICAL AND THERMAL STABILITY, AND ITS APPLICATION

(75) Inventors: Josiane Enggasser, Emmenbruecke; Werner Vogt, Sempach, both of (CH)

(73) Assignee: Rhodia Filtec AG, Emmenbruecke (CH)

( * ) Notice: Subject to any disclaimer, the term of this patent is extended or adjusted under 35 U.S.C. 154(b) by 0 days.

(21) Appl. No.: 09/091,378

(22) PCT Filed: May 14, 1997

(86) PCT No.: PCT/CH97/00189

§ 371 Date: Jun. 17, 1998

§ 102(e) Date: Jun. 17, 1998

(87) PCT Pub. No.: WO97/44378

PCT Pub. Date: Nov. 12, 1979

(30) Foreign Application Priority Data

May 23, 1996 (CH) .................................................. 1304/96

(51) Int. Cl.⁷ ................................ C08J 5/10; C08K 5/13; C08L 31/08

(52) U.S. Cl. ...................... 524/350; 524/349; 264/176.1; 264/178 R; 264/211.13

(58) Field of Search ....................................... 524/349, 350; 264/176.1, 178 R, 211.23, 78, 143, 211

(56) References Cited

U.S. PATENT DOCUMENTS 4,524,165 * 6/1985 Musser et al. ......................... 524/99

* cited by examiner

Primary Examiner—Samuel A. Acquah
Assistant Examiner—U. K. Rajguru
(74) Attorney, Agent, or Firm—Michael J. Striker

(57) ABSTRACT

The process for production of a heat-stable and light-fast product consisting of multifilaments, monofilaments or flock for textile and industrial applications includes mixing from 0.2 to 0.5% by weight, based on the amount of product, of a UV absorber having a melting point of from 135 to 145° C. and a colorant having a melting point greater than 180° C. with a polyester powder at room temperature to form a starting mixture; feeding from 1 to 100% of the starting mixture and from 0 to 99% by weight PET granules into a cooled feed zone of a twin-screw extruder; operating the twin-screw extruder to melt, knead and homogenize the feed to form polymer strands, which are then cooled and cut to form a compound; and subsequently melt-spinning the compound to form the product. When the product is made by this method the UV absorber is incorporated in the product, thus avoiding the additive-related manufacturing problems.

2 Claims, No Drawings

METHOD OF MANUFACTURING POLYESTER GRANULES WITH IMPROVED PHOTOCHEMICAL AND THERMAL STABILITY, AND ITS APPLICATION

BACKGROUND OF THE INVENTION

1. Field of the Invention

The present invention relates to a process for the preparation of polyester granules (compound) having improved photochemical and thermal stability for undyed or spun-dyed filaments, and the use thereof.

2. Prior Art

For reasons of environmental protection and for applications where long filaments and large amounts of filaments of constant levelness and good color fastness are required in thermoplastic filaments, the so-called spin dyeing process has successfully become established (DE-C-2 708 789). Predominantly polymer-soluble, heat-stable organic dyes having better or poorer lightfastnesses were used. With the constantly increasing requirements for lightfastness, for example in the automotive sector, where the dyed fiber material is exposed not only to the influence of light but simultaneously to the action of considerable heat, organic and inorganic pigments are increasingly being used. Since the color range of the pigments which can be used for spin dyeing is still very modest, the continued use of polymer-soluble dyes is unavoidable. Because these dye components are predominantly so-called shading dyes, the action of extreme light and heat results not only in the usual fading but in the even more serious deficiency of a color shift. To successfully protect the spun-dyed fiber material from UV radiation, so-called UV absorbers must additionally be used.

However, the technical application of these additives has proved particularly disadvantageous, particularly owing to their tendency to sublime and owing to their low melting point of less than 180° C. Thus, conventional dusting methods, for example in the double-cone dryer or tumbler with simultaneous drying in high vacuum at temperatures above 150° C., are ruled out owing to loss of additive and soiling of the evacuation units and caking of the granule/additive bed. Continuous metering of the additive into modern, integrated and more efficient spinning lines, i.e. addition directly before the extruder to the hot granules from the continuous dryer, is not feasible owing to the known problems, such as sintering, blockage of the granule pipe and bridging. Even the addition to the cold granules merely shifts the problems to the melting zone of the extruder, where feed problems and failure to control the pressure/speed regulation owing to premature melting of the additive make satisfactory and reliable production impossible.

It is also known that dye preparations can be injected directly to the polyester melt stream, shortly before the spinneret (Chemiefaser/Textil-Industrie, 1978, pages 1048/49); here, it is necessary to choose a carrier medium which must be liquid at the temperature of molten polyester and must be completely compatible with the latter.

SUMMARY OF THE INVENTION

It is the object of the present invention to provide a process for the preparation of polyester compound granules which do not have the deficiencies listed, which process permits photochemical and thermal stabilization of undyed and spun-dyed filaments, in particular polyester filaments, for the production of multifilaments, monofilaments, flock and staple fiber for textile and industrial purposes.

This object is achieved, according to the invention, by mixing the UV absorber together with a colorant at room temperature with a polyester powder in a first process step and, in a second process step, metering 1–100% by weight of this mixture with 0–99% by weight of PET granules into the cooled feed zone of a twin-screw compounding extruder, melting, kneading and homogenizing said feed and cutting the polymer strands cooled in a water bath.

It has proved expedient to mix colorant and UV absorber with the given substrate in powder form at room temperature, according to the desired degree of dilution. This feed mixture is then metered not directly into a spinning extruder but into a twin-screw compounding extruder and is melted, kneaded and homogenized, and the colored strands cooled in a water bath are cut to give compound granules. The extruder feed zone is preferably not heated. As the UV absorber is now incorporated in the substrate, the additive-related process problems are solved. The present compound can now be melt-spun without problems on any suitable line.

Suitable colorants are those which have a melting point of >180° C. Colorants such as perinone and anthraquinone dyes and organic and inorganic pigments have proved particularly suitable.

Suitable UV absorbers are commercial UV absorbers, such as, for example, 2-(2H-benzotriazol-2-yl)-4,6-bis(1-methyl-1-phenyl)phenol. This group of UV absorbers has a melting point in the range of 135–145° C. Further additives, such as antioxidants, and preferably mixtures of UV absorbers with antioxidants are also suitable.

It has surprisingly been found that the addition of a UV absorber in a concentration of 0.1–5%, preferably between 0.1 and 1%, in particular of 0.2–0.5%, based on the finished polyester fiber, increases the lightfastnesses (lightfastness+Fakra test) of the spun-dyed polyester by at least 1.0–1.5 grades, and the loss in breaking strength are [sic] reduced by at least 50%.

The filament samples for determining the lightfastness (loss in breaking strength in %) were exposed to light in accordance with the lightfastness test method for standard SN-ISO 105 B02, and the resulting loss in breaking strength in % was calculated by the following formula, where (BS) denotes the breaking strength:

$$\text{Loss in BS} = 100 - \frac{\text{BS after exposure to light}}{\text{BS without UV absorber, before exposure to light}} \times 100$$

The FAKRA was carried out according to DIN 75202.

The invention is to be illustrated in more detail with reference to examples.

EXAMPLES

Example 1

A polyester comprising at least 85% by weight of polyethylene terephthalate units and 0.05% by weight of $TiO_2$ and a varying amount of UV absorber was prepared. The UV absorber was mixed with the polyester powder at room temperature and the mixture was compounded. The compound obtained was spun by known methods. The test results are shown in Table 1 for undyed polyester filaments. The amounts are stated in % by weight.

TABLE 1

| Test No. | % of UV absorber | Loss in breaking strength in % |
|---|---|---|
| 1 | 0 | 14 |
| 2 | 0.1 | 15 |
| 3 | 0.2 | 9 |
| 4 | 0.3 | 7 |
| 5 | 0.5 | 6 |

Tests No. 1–5 show that the loss in breaking strength decreases with increasing amount of UV absorber.

Example 2

In this example, the test series carried out was the same as that in Example 1, except that in addition 0.3% by weight of the dye "Estofil Grün S-3GL" (trade mark of CLARIANT, Huningue, France) was added. The test results are shown in Table 2 for dyed polyester filaments.

TABLE 2

| Test No. % [sic] | UV absorber | LF* | FAK** | Loss in breaking strength in % |
|---|---|---|---|---|
| 6 | 0 | 4 | 4 | 12 |
| 7 | 0.1 | 5 | 5 | 17 |
| 8 | 0.2 | 5– | 5 | 6 |
| 9 | 0.3 | 5–6 | –6 | 6 |
| 10 | 0.5 | –6 | 6 | 11 |

*LF = Lightfastness according to SN-ISO 105 B02
**FAK = FAKRA according to DIN 75202

Tests 6–10 show that, surprisingly, the loss in breaking strength passes through a minimum in the presence of a dye, and does so at a concentration of the UV absorber between 0.2 and 0.3%.

With the process according to the invention, it was possible for the first time to reduce the loss in breaking strength of spun-dyed polyester yarns by about 50% compared with the prior art. The lightfastness was improved by at least 1 grade and the FAKRA by at least 1.5 grades.

The process is suitable in an analogous manner also for the preparation of melt-spinnable polyamide compound granules.

The polyester compound granules according to the invention can be used for the production of shaped thermoplastic articles which are intended to be lightfast and heat-stable.

What is claimed is:

1. A process for production of a heat-stable and light-fast product for textile and industrial applications, wherein said product contains from 0.2 to 0.3% by weight, based on a total amount of said product, of a UV absorber, said UV absorber having a melting point of from 135 to 145° C., said process comprising the steps of:

a) mixing said UV absorber and a colorant with a polyester powder at room temperature to form a starting mixture, wherein said colorant is selected from the group consisting of perinone and anthraquinone dyes and said U.V. absorber is 2-(2H-benzotriazol-2-yl)4,6-bis-(1-methyl)1-phenyl)phenol;

b) metering a feed consisting of from 1 to 100% of said starting mixture and from 0 to 99% by weight of polyethylene terephthalate granules into a cooled feed zone of a twin-screw extruder;

c) melting, kneading and homogenizing said feed in said twin-screw extruder to form polymer strands; and d) cooling said polymer strands in a water bath to form cooled strands and cutting said cooled strands to form a compound;

whereby said UV absorber is incorporated into said compound.

2. A process for production of a heat-stable and light-fast product of polyester comprising at least 85% by weight of polyethylene terephthalate units, wherein said product contains from 0.2 to 0.5% by weight, based on a total amount of said product, of a UV absorber having a melting point of from 135 to 145° C., said process comprising the steps of:

a) mixing said UV absorber and a colorant with a polyester powder at room temperature to form a starting mixture, wherein said polyester powder comprises at least 85% by weight polyethylene terephthalate and said colorant is selected from the group consisting of perinone and anthraquinone dye compounds having a melting point greater than 180° C.;

b) metering said starting mixture into a cooled feed zone of a twin-screw extruder;

c) melting, kneading and homogenizing said starting mixture in said twin-screw extruder to form polymer strands;

d) subsequently cooling the polymer strands in a water bath to form cooled strands and cutting the cooled strands to form a compound; and e) then melt-spinning said compound to form said product; whereby said UV absorber is incorporated into said product.

* * * * *